United States Patent [19]

Schäfer et al.

[11] Patent Number: 5,034,084

[45] Date of Patent: Jul. 23, 1991

[54] METHOD FOR OBTAINING MARBLEIZED COATINGS ON SHEET-LIKE MATERIALS AND SYNTHETIC RESIN-CONTAINING SUPPORT SHEETS SUITABLE FOR THIS PURPOSE

[75] Inventors: Werner Schäfer; Manfred Scheiba, both of Essen, Fed. Rep. of Germany

[73] Assignee: Th. Goldschmidt AG, Essen, Fed. Rep. of Germany

[21] Appl. No.: 387,027

[22] Filed: Jul. 27, 1989

[30] Foreign Application Priority Data

Aug. 29, 1988 [EP] European Pat. Off. ........ 88114031.3

[51] Int. Cl.$^5$ .............................................. B32B 31/00

[52] U.S. Cl. .................................... 156/278; 156/276; 156/307.3; 156/313; 427/268; 427/281; 428/324

[58] Field of Search ...................... 156/278, 276, 307.3, 156/313; 428/324; 427/268, 281

[56] References Cited

U.S. PATENT DOCUMENTS

| | | | |
|---|---|---|---|
| 4,551,491 | 11/1985 | Panush | 428/324 |
| 4,744,832 | 5/1988 | Franz et al. | 428/324 |

*Primary Examiner*—John J. Gallagher
*Attorney, Agent, or Firm*—Toren, McGeady & Associates

[57] ABSTRACT

A method for the decorative coating of sheet-like materials, particularly laminated plastics and wood-derived panels is disclosed to achieve a marbled decor effect by pressing a support sheet, impregnated with a curable aminoplast resin and coateed with a thermoplastic or duroplastic synthetic resin, on the substrate to be coated at the melting or curing temperatures of the resins, in which (a) a support sheet is used which has two superimposed layers of a transparent, thermoplastic or duroplastic synthetic resin, which flows well under the pressing conditions, the layer facing the support sheet containing a flake or scale-like pigment in an amount of 2 to 40% by weight of the synthetic resin and the outer layer of synthetic resin being devoid of such pigments and (b) the pressing is carried out in a compression mold or tool, which has no surface profiling.

The invention furthermore is directed to the synthetic resin-containing support sheets used in the inventive method.

The coated materials have a marbled surface and are suitable particularly for the manufacture of doors, furniture, table tops, facade elements, exhibition booths or for the decoration of rooms, such s foyers, waiting rooms and switch rooms.

11 Claims, 1 Drawing Sheet

Figure 1:
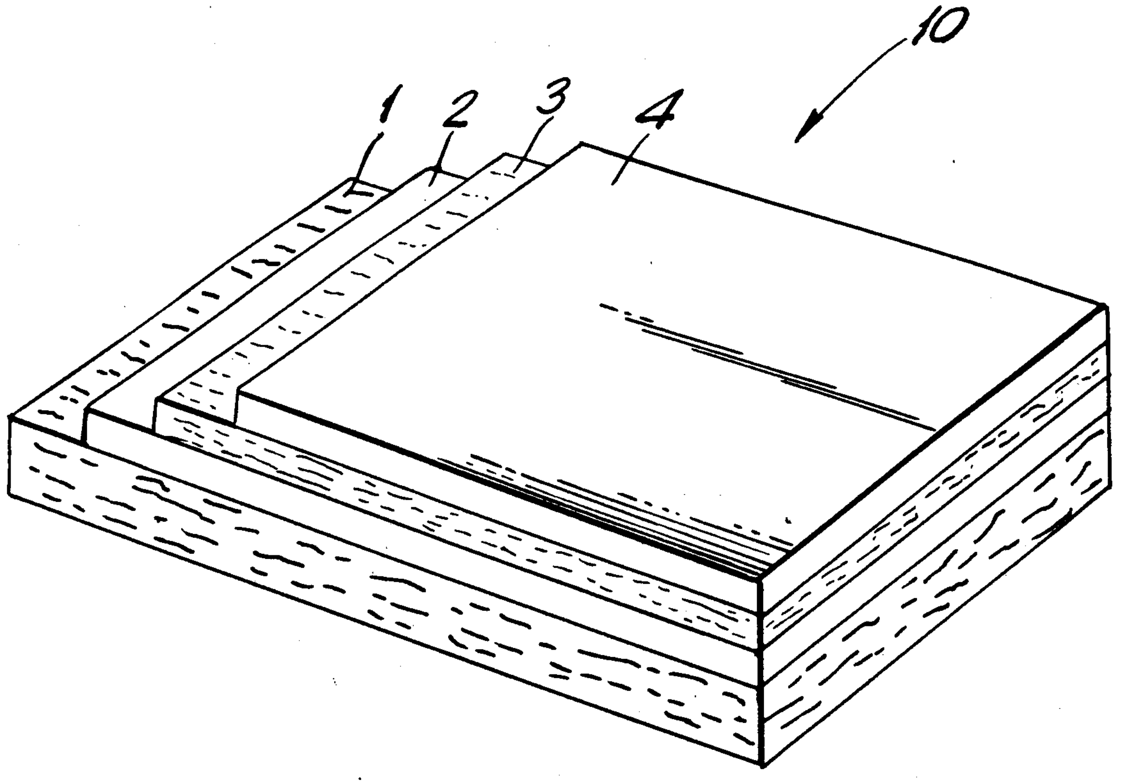

METHOD FOR OBTAINING MARBLEIZED COATINGS ON SHEET-LIKE MATERIALS AND SYNTHETIC RESIN-CONTAINING SUPPORT SHEETS SUITABLE FOR THIS PURPOSE

FIELD OF THE INVENTION

The invention is directed to a method for the decorative coating of flat or sheet-like materials, particularly laminated plastics and wood-derived panels to achieve a marbleized decor effect, by pressing a support sheet, impregnated with a curable aminoplast resin and coated with a thermoplastic or duroplastic synthetic resin, on the substrate to be coated at the melting or curing temperatures of the resins. The invention is also concerned with a synthetic resin-containing support sheet for carrying out the inventive method.

BACKGROUND INFORMATION AND PRIOR ART

According to the state of the art, wood-derived panels, such as chip-boards, fiber boards, plywood panels, wood core plywood, panels from cellulose waste or laminates from a plurality of layers of resin-laminated core papers are coated on a large scale with decoratively printed or dyed support sheets, which generally are impregnated with aminoplast resins curable at elevated temperatures and coated with curable or thermoplastic condensation or polymerization resins. Products with particularly advantageous use properties are obtained if melamine-formaldehyde precondensates are used for the impregnation while curable polymerization resins, such as copolymers, which are based on (meth)acrylate esters, or unsaturated polyester resins are employed for the coating. This state of the art is described in greater detail, for example, in DE-C No. 2,734,669 and DE-C No. 3,403,691.

Such support sheets, intended for finishing or improving surfaces, are generally prepared by first impregnating the paper sheets, which are to be used as support sheets, with the aqueous solution of a curable aminoplast resin precondensate. In so doing, the cellulose fibers of the support sheet should be enveloped completely. This generally requires an amount of aminoplast resin (calculated as solid resin) of 50 to 100% of the weight of the paper. The sheets so obtained are dried so as to avoid the complete curing of the aminoplast resin. The impregnated support sheets can be coated by dissolving the coating resin in a suitable solvent, such as methylene chloride, methyl ethyl ketone, tetrahydrofuran or solvent mixtures and pouring the solution obtained on the impregnated support sheet. The solvent is then evaporated off.

To achieve a decorative surface, the support sheet used to finish the surface is printed with a decor to match the application or dyed a uniform color. The transparent coating lacquers should allow the decor or the uniform color to shine through brilliantly and clearly.

The surface of the sheet-like support, such as a chipboard, can be improved with the synthetic resin-containing support sheet by pressing the decorative, resin-impregnated support sheet onto the support in a hot press at temperatures of about 130° to 180° C. and a pressure of about 0.3 to 10 N/mm$^2$, using platens. In so doing, the resin cover layer assumes a degree of gloss, which corresponds to that of the surface of the platen. It is also possible to cure the resin-impregnated support sheets by themselves and to then glue them onto the support sheets, using glue presses if necessary. In the case of laminates which consist of several layers of curable resin-impregnated core paper, the formation of the laminate by pressing the resin-impregnated core paper while curing the impregnating resins and the surface improvement can be carried out simultaneously in one step.

The surfaces of asbestos cement boards or gypsum plaster boards can be improved in much the same way as those of wood-derived panels. The surfaces of sheet-like components, such as panels with a honeycomb structure, which are produced in lightweight construction processes and optionally coated with metal foil, such as aluminum foil, can also be improved.

Sheet-like materials, the surface of which is improved in such a manner, combine good use properties of the surfaces (abrasion resistance, scratch resistance solvent resistance) with a decorative, aesthetically pleasing effect. The surface-improved, sheet-like materials are therefore preferred for the manufacture of objects with decorative surfaces such as doors, furniture, table tops, facade elements, exhibition booths, or for the decoration of rooms, such as foyers, waiting rooms, switch rooms, etc.

The surfaces may also be structured or patterned. Structuring is accomplished during the pressing while using a compression mold or tool with a relief-type surface, the structure or pattern of which is reproduced in negative form on the surface improving layer. With pronounced, deep profiling and the use of differently dyed synthetic resin layers, special color effects can be achieved because the first layer of synthetic resin, facing the compression tool during the pressing, is pushed away from the raised areas of the compression mold and flows away to the areas of lesser pressure. Corresponding to the raised areas of the profile of the compression tool, the color of the second resin layer and/or the color of the dyed or printed support sheet can be recognized. Such a method is disclosed in the German Auslegeschrift No. 2,650,560.

OBJECT OF THE INVENTION

It is the primary object of the invention to improve the surface of flat or sheet-like materials with synthetic resins under the formation of a marbleized decor effect. A marbleized decor effect is understood to mean an inhomogeneous distribution of the color-linked medium in the surface layer of the synthetic resin(s). This inhomogeneous distribution of the color-linked medium bears a certain resemblance to the distribution of color in marble.

Generally, it is an object of the invention to improve on procedures for obtaining decorative coatings on sheet-like materials.

SUMMARY OF THE INVENTION

Pursuant to the invention, a) a support sheet is used which has two superimposed layers of transparent, thermoplastic or duroplastic synthetic resin, which flows well under the pressing conditions; the layer facing the support sheet contains a flake or scale-shaped pigment in an amount of 2 to 40% by weight calculated on the synthetic resin while the outer layer of synthetic resin is free of such pigments, and b) the pressing is carried out with a compression tool which has no surface profiling or pattern.

Pursuant to the invention, the concept of flake or scale-shaped pigment (hereinafter "flake pigment") is understood to refer to a planar or laminar-like pigment of very small layer thickness. The particle size of the pigment is preferably 5 to 100 μm and is understood to be the 2-dimensional or planar extent of the pigment. The layer thickness of the pigment is significantly less and usually smaller than 1 μm.

Preferably a synthetic resin-containing support sheet is used for carrying out the inventive method, in which the flake pigment is contained in the synthetic resin layer facing the support sheet. Preferably the flake pigment is present in an amount of 5 to 20% by weight based on the synthetic resin.

Such flake pigments are known to those skilled in the art. A particularly suitable and, therefore, preferred pigment of the desired spatial shape is mica, the surface of which has been acted upon by metal oxides, preferably titanium dioxide or iron oxide. These are lustrous pigments which endow the synthetic resin layer with a metal effect in the inventive method. Such pigments are commercially available under the name of Iriodin® pigments.

A different example of flake pigments are the metal pigments obtained from metals or metal alloys by rolling and comminuting. To prepare these pigments, preferably ductile metals or alloys such as aluminum, copper and silver, or brass alloys and bronze alloys are used.

Special metal color effects are produced if the metal surfaces, especially the surfaces of aluminum pigments, are acted upon or enriched by metal oxides, preferably iron oxides. The publications "Eisenoxidbeschichtete Aluminium Pigmente" (Aluminum Pigments Coated with Iron Oxide) and "Optische Eigenschaften von Perlglanzpigmenten" (Optical Properties of Lustrous Pigments) in the journal farbe+lack (1987, pages 973 to 979) are referred to for the state of the art.

Preferably, for the inventive method, a support sheet is used which has a paper substrate with a paper weight of 40 to 120 $g/m^2$. The paper substrate is impregnated with a curable aminoplast resin in an amount of 80 to 150% of the weight of the paper and coated with at least two layers of a curable or duroplastic synthetic resin with a weight per unit area of 30 to 100 $gm^2$.

The synthetic resin may be dyed with a dye that is soluble in the synthetic resin. To achieve a special color effect, it is also possible to dye only the synthetic resin used to produce the cover layer.

If such a support sheet is pressed in the inventive method onto a sheet-like material, such as a wood panel, at elevated temperatures, the aminoplast resin used to impregnate the substrate flows, perfuses and envelops the fibers of the substrate and cures. If a curable resin is selected as the coating resin, this resin also commences to flow, forms a surface corresponding to that of the compression mold, and cures. If a thermoplastic synthetic resin is used as coating resin, the latter also flows and adapts its surface to that of the compression tool. In this latter case, however, it is necessary to cool the press under pressure until the thermoplastic resin has solidified once again and can be removed from the press after it has cooled. The desired marbleizing effect occurs because, due to the inhomogeneous mass distribution in the paper, the resin flow during the pressing process occurs from regions of high density to regions of lower density. In regions of lower density, the resin flows more quickly; in regions of higher density, the resin flows correspondingly more slowly. As the resin flows, the finely divided mica or the like flake pigment orients itself in the flow direction because of its platelet-like shape and, in so doing, reproduces the flow structure.

This effect is particularly intensified and recognizable because the top resin layer is free of pigments. Because of the dilution effect, the flow of the resin is intensified, so that the orientation of the mica or the like particles is promoted. The surface obtained after pressing shows a decor image which has a pronounced marbleization due to the inhomogeneous distribution of the pigment.

Corresponding to feature b) of the inventive method, the pressing takes place with a compression tool which has no surface profiling or pattern. A profiling of the compression tool as disclosed in German Auslegeschrift No. 2,650,560 would impede the free flow of the resins to areas of lower density and thus detract from the alignment of the flake pigments in the flow direction. However, it will be appreciated that the surface of the compression tool is permitted to have a certain depth of roughness as long as the free flow of the resin is not impeded.

The differential flow of the coating resin can also be brought about or intensified in a different manner. Thus, before the pressing, sections of a resin-impregnated support layer may be placed in a regular or irregular fashion below the support sheet to be used in the inventive method. These sections may be placed, for example, to form a desired pattern. Such sections may have any geometric shape and be constructed, for example, symmetrically or irregularly. The sections may, for example, have the shape of a maple or oak leaf. Dried and natural leaves, such as oak leaves, which are optionally impregnated with resin, may also be inserted. The surface structures of the leaves emerge clearly. The inserted sections stand out clearly in color and marbleization from the surrounding background.

The color of the marbleization effect is emphasized particularly if a uniformly colored support sheet is used, the color of which contrasts with the inherent color of the pigment. For example, lustrous pigments with a gold or copper color can be used to good effect with a support sheet that has been dyed blue.

Lacquer films are known from the art which consist of two layers, the lower layer of which contains mica-like pigments, while the upper layer (cover layer) is free of pigments. Such lacquer structures known, for example, in the automobile industry for the production of metal-effect lacquers are described, for example, in DE-A No. 3,207,936 or DE-A No. 3,150,492. They essentially differ from the structures of the present invention. This is so because no pressure is exerted when the lacquer layers are applied on the substrate and the above described flow processes do not take place. The pigments in these known structures are distributed uniformly in the lacquer layer. Therefore, if the pigment content in the lacquer layer is too low, only an iridescent effect occurs (German Auslegeschrift No. 3,150,492, page 6). An inhomogeneous distribution of pigment would also be most undesirable when lacquering an automobile body sheet or the like.

The invention also provides a novel synthetic resin-containing support sheet to be used in the inventive method. The support sheet comprises two superimposed layers of a transparent, thermoplastic or duroplastic synthetic resin which flows well under the pressing conditions. The synthetic resin layer facing the support sheet contains a flake pigment in an amount of 2 to 40% by weight based on the synthetic resin while the outer synthetic resin layer is free of such pigments. The above mentioned particulars for the preferred pigments and the nature of the paper substrate preferably used as well as the resins for the impregnation and coating are also applicable for the support sheet structure.

To prepare the inventive, synthetic resin-containing support sheets, the known curable aminoplast resins, such as the low molecular weight urea-formaldehyde resins or melamine-formaldehyde resins or urea-melamine formaldehyde resin mixtures can be used as impregnating resins. As coating resins, curable, duroplastic or unreactive, thermoplastic resins come into consideration. Suitable curable resins are the curable polyester resins that are based on esters of unsaturated or mixtures of saturated and unsaturated dicarboxylic acids in a reactive solvent, such as styrene. Further suitable polyesters are disclosed, for example, in DE-C No. 3,403,691 and DE-C No. 2,734,669. Curable acrylate or methacrylate resins or epoxide resins are also suitable as curable coating resins. Thermoplastic coating resins can be composed on the basis of melamine resins, which are etherified with short-chain aliphatic alcohols. Further examples of suitable thermoplastic coating resins are polyester resins or resins based on acrylate.

In the following examples, the inventive method, the preparation of the support sheets containing the synthetic resin, and their processing are explained in even greater detail, it being understood that these examples are given by way of illustration and not by way of limitation.

EXAMPLE 1

As support sheet, a dissolving-pulp paper with weight per unit area of 80 g/m$^2$ is used. The paper is dyed with green pigments. The paper is impregnated with melamine-formaldehyde condensation resin and contains 80 g/m$^2$ of resin. The resin-containing support sheet has a moisture content of 6 to 7%.

The resin has the following composition.

Pigmented Coating Resin 310 g flowable unsaturated polyester resin
40 g diallyl phthalate prepolymer
35 g partially etherified melamine-formaldehyde resin
248 g dichloromethane
3 g p-toluenesulfonic acid
13 g internal release agent
40 g Iriodin® Pigment Rotbraun 502
2g benzoyl peroxide paste
17 g peroxide mixture

Transparent Coating Resin as above, but not pigmented.

The pigmented coating resin is applied on the support sheet with a doctor blade at the rate of 50 g/m$^2$. The solvent is evaporated off in a drying tunnel at a temperature of 40° to 80° C. The residual solvent content then is 8 to 9%. The transparent coating resin is then applied in the same amount with a second metering mechanism and dried in the same way. To prepare a surface-improved laminate, the following construction is brought into a hot press:

press pad
platen
support film, of the invention
10 core films, phenolic resin impregnated, paper weight of 150 g/cm$^2$, resin content of 70 g/m$^2$ solid resin
release paper
platen The pressing takes places in a multi-daylight press at a pressure of 10 N/mm$^2$, a temperature to 145° C. and a pressing time of 20 minutes. The material pressed is cooled under pressure.

A laminate with a brown, marbled surface is obtained.

EXAMPLE 2

The support sheet described in Example 1 is coated. The following are used as coating resins:

Coating Resin, Pigmented 100 g melamine-formaldehyde resin, etherified with butanol, as a 55 to 60% by weight solution in a butanol/xylene mixture
1 g p-toluenesulfonic acid, as a 50% solution in methanol
1.5 g Iridion® Pigment Rotbraun 502

Coating Resin, Transparent as above, but not pigmented

The pigmented coating resin is applied on the support sheet with a doctor blade at the rate of 50 g/m$^2$. The solvent is evaporated off in a drying tunnel at 50° to 80° C. In a second application, the transparent, unpigmented resin is applied in the same manner and the product obtained is dried.

To prepare a surface-improved laminate, the following construction is brought into a hot press:

press pad
platen
support film, of the invention
50 core films, phenolic resin impregnated, paper weight of 150 g/cm$^2$, resin content of 70 g/m$^2$ solid resin
support film, of the invention
platen
press pad The pressing takes place in a multidaylight press at a pressure of 10 N/mm$^2$, a temperature of 145° C. and a pressing time of 45 minutes. The material pressed is cooled under pressure.

A panel, surface improved on both sides and with a decorative marbleization, is obtained.

EXAMPLE 3

A support film, as described in Example 1, is coated. The following composition is used as coating resin:

Coating Resin, Pigmented 100 g diallyl phthalate prepolymer
100 g dichloromethane
3 g internal release agent
0.5 g benzoyl peroxide paste
4 g peroxide mixture
10 g Iridion® Pigment Rotbraun 502

Coating Resin, Transparent as above, however, not pigmented

The preparation of the coated support sheet is carried out as in Example 1.

To prepare a surface-improved chipboard, the following construction is brought into a hot press:

press pad
platen support film, of the invention melamine resin barrier film, paper weight of 120 g/$m^2$,
resin content of 150 g/$m^2$
chipboard
melamine resin barrier film support film, of the invention
platen
press pad The pressing takes place in a multidaylight press at a pressure of 2 N/$mm^2$, a temperature to 145° C. and a pressing time of 12 minutes. The material pressed is cooled under pressure. The surface improved panel obtained shows a decorative marbleization and is outstandingly suitable for interior purposes (furniture, exhibition purposes).

EXAMPLE 4

The method of Example 1 is repeated; however, 4 g of the solvent-soluble dye Zaponblau 807 are added to the transparent coating resin. A surface dyeing with marbleization corresponding to the varying blue dyeing results.

EXAMPLE 5

A support sheet, as described in Example 1, is coated. The following are used as coating resins:

Coating Resin, Pigmented 80 g diallyl phthalate prepolymer
120 g dichloromethane
2.5 g internal release agent
4 g dicumyl peroxide
4 g aluminum paste
4 g carbon black paste Coating Resin, Transparent
as above, but not pigmented.

The coated carrier is prepared as in Example 1 and the surface improved chipboard as in Example 3. A surface-improved panel is obtained, which has a silver metal marbleization and is particularly suitable for the production of decorative surfaces.

IN THE DRAWING

An inventive support sheet is diagramatically shown in the single figure which shows the layer thicknesses in somewhat exaggerated dimensions for the sake of clarity.

The support sheet of the figure, which is generally indicated by reference numeral 10, comprises a paper substrate 1 which is impregnated with a curable aminoplast resin. A layer, also of curable aminoplast resin, is superimposed on the paper substrate 1. Layer 3 superimposed upon layer 2 is, in the present showing, composed of diallyl phthalate prepolymer. A further layer indicated by reference numeral 4 is superimposed on layer 3 and also is composed of diallyl phthalate prepolymer. Layer 3 comprises the flake or scale-like pigment while layer 4 is devoid of such pigment. The support sheet 10 is applied to the object to be improved under pressure and at elevated temperature under the conditions specified hereinabove.

We claim:

1. In a method of decoratively surface improving an object having a generally flat surface by applying a coating on the flat surface of the object, wherein a multi-layered support sheet is pressed onto said flat surface and the support sheet comprises a substrate impregnated with curable aminoplast resin and coated with thermoplastic or duroplastic synthetic resin, said pressing being effected at temperatures at which said resins melt or cure, the improvement which comprises that:

a) said impregnated substrate of the support sheet is coated with first and second superimposed layers of transparent thermoplastic or duroplastic resin which flows under the pressing conditions of application;
b) said first resin layer faces said impregnated substrate and contains flake or scale-like pigment particles in an amount of about between 2 to 40% by weight calculated on the amount of resin in said first layer, while said second layer is devoid of said pigment; and
c) said pressing is effected with a press tool which is essentially devoid of a surface pattern, whereby, due to flowing of the resin layers, a marbleizing decor effect is obtained.

2. The improvement of claim 1, wherein said pigment has a particle size of between about 5 to 100 μm.

3. The improvement of claims 1 or 2, wherein the amount of said pigment in said first layer is between about 5 to 20% by weight calculated on the resin in said first layer.

4. The improvement of claims 1 or 2, wherein said pigment is mica which has been surface treated with metal oxide.

5. The improvement of claim 4, wherein said metal oxide is titanium dioxide or iron oxide.

6. The improvement of claim 1 or 2, wherein said pigment comprises metals or metal alloys.

7. The improvement of claims 1 or 2, wherein said pigment essentially consists of a ductile aluminum, copper or silver.

8. The improvement of claims 1 or 2, wherein said pigment essentially consists of brass or bronze alloys.

9. The improvement of claims 1 or 2, wherein said substrate is paper having a unit weight of 40 to 120 g/$m^2$, said paper being impregnated with a curable aminoplast resin in an amount of about between 80 to 150% calculated on the weight of the paper.

10. The improvement of claim 9, wherein said first and second layers comprise curable or duroplastic synthetic resin with a unit weight of about between 30 to 100 g/$m^2$.

11. The improvement as claimed in claims 1 or 2, wherein said object is a plastic laminate or a panel derived from wood.

* * * * *